(12) United States Patent
Kaidi et al.

(10) Patent No.: US 12,353,396 B2
(45) Date of Patent: Jul. 8, 2025

(54) EXTENSIVE-DIMENSIONAL SOLUTIONS FOR DATA LINEAGE

(71) Applicant: PAYPAL, INC., San Jose, CA (US)

(72) Inventors: George Chen Kaidi, Singapore (SG); Kim Dung Bui, Singapore (SG); Vipul Jain, Singapore (SG); Sreeram Vasudevan, Singapore (SG)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 18/193,433

(22) Filed: Mar. 30, 2023

(65) Prior Publication Data

US 2024/0330267 A1 Oct. 3, 2024

(51) Int. Cl.
*G06F 7/00* (2006.01)
*G06F 16/23* (2019.01)
*G06F 17/00* (2019.01)

(52) U.S. Cl.
CPC ...... *G06F 16/2358* (2019.01); *G06F 16/2379* (2019.01)

(58) Field of Classification Search
None
See application file for complete search history.

(56) References Cited

U.S. PATENT DOCUMENTS

| | | | |
|---|---|---|---|
| 11,449,371 B1* | 9/2022 | Goyal | G06F 11/3409 |
| 2018/0012460 A1* | 1/2018 | Heitz, III | G08B 13/19682 |
| 2018/0012463 A1* | 1/2018 | Chaudhry | G06T 7/246 |
| 2018/0113994 A1* | 4/2018 | Sexton | G16H 10/60 |
| 2022/0200627 A1* | 6/2022 | Bickel | G01R 31/08 |

\* cited by examiner

*Primary Examiner* — Tuan A Pham
(74) *Attorney, Agent, or Firm* — Greenberg Traurig, LLP

(57) ABSTRACT

A method according to the present disclosure may include receiving, from a user device, an update associated with a document, generating an update log event based on the update, appending metadata to the update log event, the metadata indicative of a property of the update, storing the update log event with at least one other log event to generate a plurality of log events, receiving an indication of a type of compression, labelling metadata of each of the plurality of log events based on the indicated type of compression, and compressing the plurality of log events based on the labels.

20 Claims, 9 Drawing Sheets

| | time | user | action | change |
|---|---|---|---|---|
| 301 | 1661062512 | reed | insert new email address | email: reed@example.com |
| 302 | 1661177349 | johnny | update credit card | CreditCard: 1234-5678-9876-5432 |
| 303 | 1661348498 | sue | update credit card | CreditCard: 1234-5678-9876-1234 |
| 304 | 1661762676 | ben | insert new email address | email: ben@example.com |
| 305 | 1661781180 | reed | remove email address | email: - |

300 →

| | time | user | action | change |
|---|---|---|---|---|
| 351 | 1661060000 | reed, ben | insert+remove, insert email address | email: reed@example.com, ben@example.com |
| 352 | 1661170000 | johnny, sue | update credit card | CreditCard: 1234-5678-9876-5432, 1234-5678-9876-1234 |

EXTENSIVE-DIMENSIONAL SOLUTIONS FOR DATA LINEAGE

TECHNICAL FIELD

The instant disclosure relates to managing and maintaining a log of changes made to documents.

BACKGROUND

Collaborative work often includes multiple parties working on the same document from different computers or work stations. Tracking the changes made to this shared document relies on the underlying document software, and may be native to the computer making the relevant changes. Documents for collaborative work may also be stored in the cloud, and may be tethered to a particular distributed ledger for security.

BRIEF DESCRIPTION OF THE DRAWINGS

FIG. 3 illustrates an example set of uncompressed logs and an example set of compressed logs.

DETAILED DESCRIPTION

Figure 1:
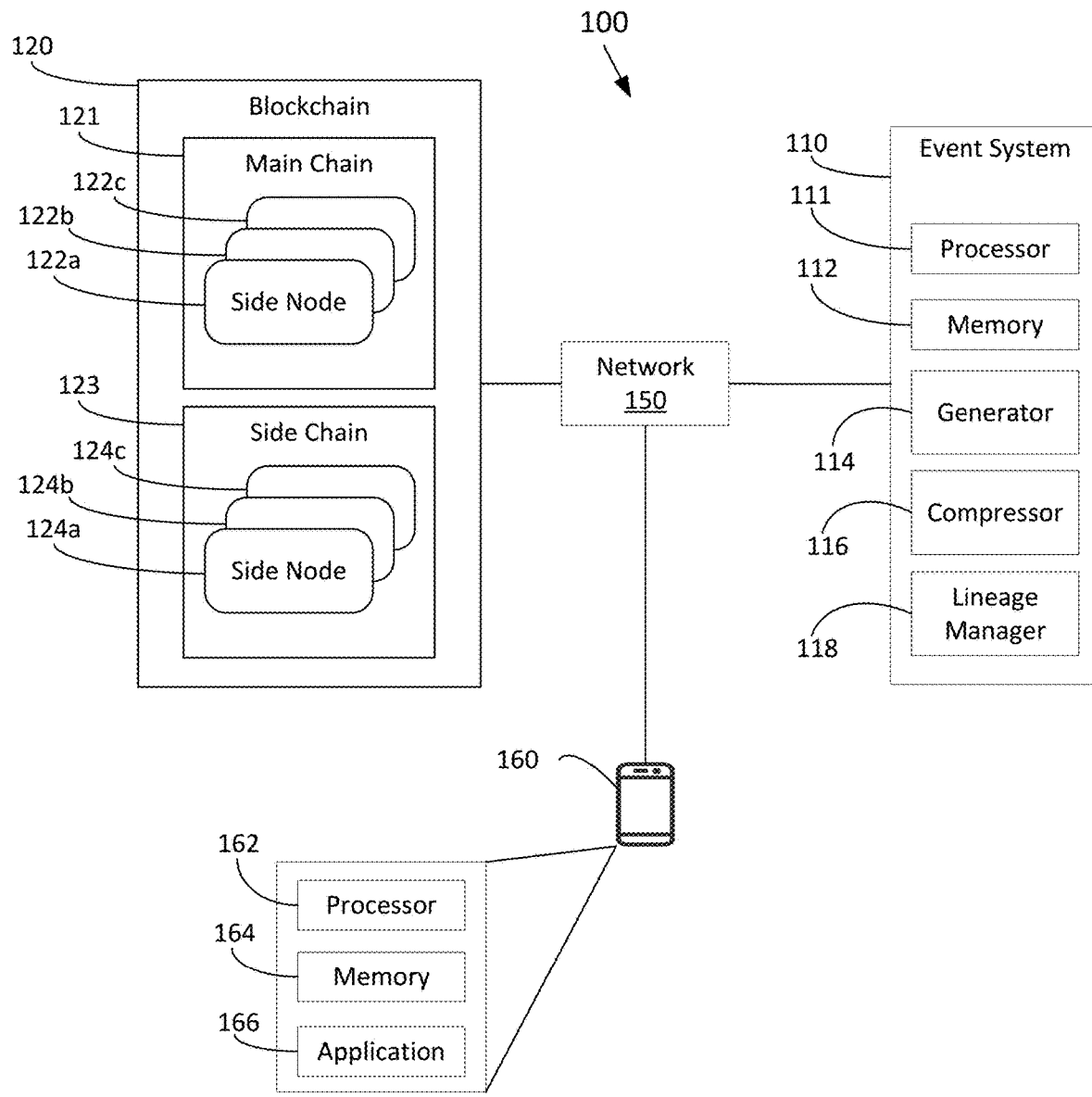
FIG. 1 is a block diagram of an example system for managing data and maintaining data lineage.

Generally, collaborative work from remote work stations (e.g., various users at their home computers) relies heavily on the security and other features provided by the software underlying the collaborative work, as the distributed nature of the users' work stations makes it difficult to manage security on the user end (e.g., as opposed to computers hosted and connected by an intranet). While this provides added flexibility and increased efficiency for the users, it can create difficulties for data lineage, and particularly issues regarding document ownership, as responsibility for the document is spread across the remote work stations. For example, several engineers may contribute to code for the same program, but it can be difficult to parse which engineer was responsible for which revisions or additions, as well as which portions of code were introduced at which times.

Even if each individual change, edit, addition, or deletion to this shared document is tracked and stored, the quantity of memory required to maintain such a log may be untenably large. In addition, because these work stations are remote, such a system also raises the question of where this log would be stored. Particularly when the shared document is subject to auditing, it is important to consider the frequency with which data are captured (e.g., "shapshot") for audit procedures, as a too-low frequency may provide insufficient information while a too-high frequency may be unnecessary. The types of data captured for the audit must also be set. For example, it may be sufficient to capture just the changes to the shared document from the last snapshot, or it may be required to capture the entire version of the shared document at each snapshot.

As such, it is advantageous to provide, according to the disclosure herein, a system that tracks and logs document-related events (e.g., edits, etc.), compresses the logs to an adequately-small size to maintain data storage practices, and stores the compressed logs in a secure location. In particular, a system as described herein addresses issues relating to compliance, cybersecurity, and online identity. By managing and maintaining lineage data for documents, including a changelog and associated user details, the system may increase the reliability of compliance measures due to the accessibility provided by the maintained lineage data. Furthermore, because the system may include compression methods, the system is scalable for large networks, which can enable even the largest companies or groups to maintain, for example, the necessary changelogs for compliance.

Lineage data managed according to this disclosure may also provide improved cybersecurity, as breaches or insecurities can more clearly be traced to their sources. This is also true for when bits of code are re-used or borrowed from other logic sources, as the lineage data are associated with the bits themselves, meaning that ownership is not lost simply by using the code in a different document. Accordingly, the lineage data may not only be used to identify the sources of threats but also be used to anticipate threats. For example, if a bit of code in one document is identified as a threat or otherwise compromised, the system as described herein may enable identification of all documents that use the compromised bit of code to facilitate remedial efforts.

A system according to the present disclosure may also provide assistance in the drafting and revising process for a document. By clarifying the source, author, or user that generated a portion of a document, the next steps for that portion can further be clarified. For example, if a portion of code was originally drafted for use in a first application but is re-used in a second application with an entirely different goal, the system may help flag this portion of code as needing additional review to make sure that it is being used properly. In reverse, if a portion of code is revealed during testing to be faulty or misplaced, it can be traced back to its source in order to address at the root, to identify the original draftsperson who may be in the best position to fix the issue, and to determine any other instances that need similar correction.

Referring to the drawings, wherein like reference numerals refer to the same or similar features in the various views, FIG. 1 is a block diagram of an example system 100 for managing data and maintaining data lineage. The system 100 may include an event system 110, a blockchain system 120, and user computing device 160. Each of the event system 110, the blockchain system 120, and the user computing device 160 may be in electronic communication with one another and/or with other components via a network 150. The network 150 may include any suitable connection (or combinations of connections) for transmitting data to and from each of the components of the system, and may include one or more communication protocols that dictate and control the exchange of data.

As shown, the event system 110 may include one or more functional modules 114, 116, and 118 embodied in hardware and/or software. In an embodiment, the functional modules 114, 116, and 118 of the event system 110 may be embodied in a processor 111 and a memory 112 (i.e., a non-transitory, computer-readable medium) storing instructions that, when executed by the processor 111, cause the event system 110 to perform the functionality of one or more of the functional modules 114, 116, and 118 and/or other functionality of this disclosure. For example, the event system 110 may provide a graphical user interface (GUI) for the user device 160 that may enable the user to interact with one or more functions of event system 110 and/or the main chain 121.

The blockchain system 120 may be a distributed ledger system formed from a consensus of synchronized data from multiple computing devices that, by sharing, replicating, and cross-checking these data across multiple computing devices, may provide a repository for data that is functionally immutable and secure. The blockchain system 120 may include a plurality of blockchains. For example, the blockchain system 120 may include a main chain 121 and a side chain 123, which may be chains used in conjunction to manage and store document lineage data and/or other data, as described herein. The main chain 121 may be designated or utilized as a primary repository for the lineage data managed by the event system 110. As shown, the main chain 121 may include main nodes 122a, 122b, and 122c (collectively "main nodes 122"), which each may store and manage a copy of the entire main chain 121. Although three main nodes 122 are illustrated and described herein, it should be understood that any appropriate number of nodes may be utilized to establish trust and consensus under the blockchain protocol used for main chain 121.

By comparing each node's copy of the main chain 121 to another node's copy of the main chain 121, and identifying and resolving any differences according to defined procedure (e.g., by majority rule in which the version present on a majority of nodes is held as the "correct" version, etc.), the main chain 121 may be isolated from a single point-of-failure. In addition to storing a copy of a current state of the main chain 121, each of the main nodes 122 may also store copies of previous states of the main chain 121. For example, when a new document is added to the main chain 121, each of the main nodes 122 may store a copy of the main chain 121 that includes the new document (e.g., current state) and a copy of the main chain 121 prior to the inclusion of the new document (e.g., previous state).

The blockchain system 120 may also include a side chain 123, which may function in parallel to and in coordination with (but separate from) the main chain 121 but may not exist without reference to the main chain 121. In particular, the side chain 123 may be linked to the main chain 121, such that the assets (e.g., documents, data, etc.) from the main chain 121 may be managed on the side chain 123 while maintaining a connection to the main chain 121. In the example above in which the new document is added to the main chain 121 (e.g., by user device 160), the new document may then be linked to the side chain 123 for editing (e.g., appending of metadata). In this way, the new document may be managed without disrupting or otherwise occupying the resources of the main chain 121 while also not losing the new document's origin from the main chain 121. As such, the main chain 121 may be reserved for high-level interactions (e.g., receiving and storing documents) while the side chain 123 may be utilized for more granular interactions (e.g., editing documents, generating and appending metadata, etc.).

Storing data to the main chain 121 may include, for example, each node 122 receiving new data to be added to the main chain 121. One or more pieces of new data may be collected into a new block to be added to the main chain. Once sufficient data is accumulated to form a new block, the new data may be hashed with one or more portions of the previous blocks on the main chain 121 to form the new block. In some embodiments, the new data may be hashed with the entirety of a previous block to form the new block. In some embodiments, the new data may be hashed with the entirety of all previous data blocks in the main chain 121 to form the new block. Once hashed, the new block may be stored by each main chain node 122, such that identical blocks are stored on all nodes 122. Side chain nodes 124 may store new data intended for the side chain 123 in the same or a similar fashion.

Each node 122, 124 may be a distinct computing device or devices from each other node 122, 124, such that storage of blocks on the main chain 121 involves agreement of distinct computing devices or resources comprising the different nodes 122a, 122b, 122c and storage of blocks on the side chain 123 involves agreement of distinct computing devices or resources comprising the different nodes 124a, 124b, 124c. In some embodiments, a main chain node (122a, 122b, or 122c) and a side chain node (124a, 124b, or 124c) may be implemented on the same computing device, devices, or resources.

The main chain 121 may serve as a central repository for organizational data, such as documents, program code, and other such data, and the side chain 123 may enable the management of these data by, for example, the event system 110. Particularly, the side chain 123 may facilitate management of lineage (e.g., history) information for data stored in the main chain 121, in order to maintain a traceable database for future analysis and review. For example, if a particular document was edited in the past, the side chain 123—through the functionality of the event system 110—may identify one or more characteristics of the edit (e.g., when, by whom, what, etc.). By performing this lineage management on the side chain 123, the integrity of the underlying data on the main chain 121 may be unaffected.

The functional modules 114, 116, and 118 of the event system 110 may include a generator 114 configured to receive an indication of a document and to generate a log based on the indicated document. The indicated document may be any document stored, to be stored, edited, or otherwise changed on the main chain 121, such that the document may be a coding file (e.g., *.java, *.php, etc.), a collaborative file (e.g., *.docx, *.pptx, etc.), a text file, an editable pdf, a configurable file (e.g., *.config, etc.), a custom-format form, or a documentation page. The indication of the document may be a substantially automatic determination by the generator 114 in response to an action taken with regard to the document, or the indication of a document may be received from the user device 160 (e.g., via a user input). In those embodiments in which the document is automatically indicated, the automatic indication may be triggered by an uploading of the document to the main chain (e.g., a user saves a draft specification), an edit to the document (e.g., a user alters a line of code), a transmission of the document (e.g., a slide deck is emailed externally), or any other document-based action. In those embodiments in which the indication is received from the user device 160, the indication may identify one or more specific documents, a specific range of document values (e.g., documents altered within a time range), or documents having a specific characteristic (e.g., documents created by a particular user).

The generator 114 may generate a log based on the indicated document(s). In some embodiments, the generated log may be a datafile generally corresponding to the document, such that the generated log may contain all (or substantially all) of the data included with the document, excluding the actual content (e.g., slides in a slide deck, photo in an image file, lines of code, etc.) of the document. As such, the generated log may be a token or similar marker for the indicated document. In one example, the generated log may be represented by the following pseudo-code:

```
{
    "request": {
        "type": "Modify Address",
        "change": "Change Zip to 67589",
        "time": "2022-08-19 12:17:55 -0400",
        "status" :"ACCEPTED"
    },
    "breadcrumbs": [
        {
            "actor_type": "person",
            "actor_id": "John"
        },
        {
            "actor_type": "mobile device",
            "actor_id": "123ab3-77cvc1"
        },
        {
            "actor_type": "addressserv",
            "actor_id": "8q91ha-laiq91"
        }
    ]
}
```

In another example, the generated log may be represented by:

```
{
    "request": {
        "type": "Modify File",
        "change": "Add text",
        "location": "Lines:4-12"
        "time": "2022-08-19 12:17:55 -0400",
        "status" :"ACCEPTED"
    },
    "breadcrumbs": [
        {
            "actor_type": "person",
            "actor_id": "John"
        }
    ]
}
```

In some embodiments, the generated log may be a datafile corresponding to the action that initiated the indication of the respective document. For example, if a particular document is edited, the generated log may correspond to the particular edit, rather than to the document as a whole. In these embodiments, the generated log may contain sufficient information regarding the document in order to identify the document, and may also contain all (or substantially all) of the information relating to the action itself. Accordingly, the generated log may contain a name of the document, an owner of the document, a format of the document, or other identifying data, as well as a description of the initiating action.

In some embodiments, the generator 114 may generate the log as a separate and standalone datafile from the respective document. In some embodiments, the generator 114 may generate the log as metadata for the respective document, such that the generator appends the log directly to the respective document.

The functional modules 114, 116, and 118 of the event system 110 may include a compressor 116 configured to receive an indication of a type of compression, to label the generated logs based on the type of compression, and to sort, refine, or otherwise compress the logs based on the label. The compression type may be redundancy—in which the compression targets the reduction or elimination of duplicative logs—or relevancy—in which the compression targets the reduction or elimination of unnecessary or superfluous logs, and/or another type of compression. In some embodiments, the indication of compression type may be received from the user device 160 (e.g., via user input). In some embodiments, the indication of compression type may be automatically (e.g., by the compressor 116) received (or determined) based on one or more operating characteristics of the system 100. These operating characteristics may include periods of time, quantity of actions. For example, the system 100 may conduct redundancy-type compression every 10 days, or the system 100 may conduct relevancy-type compression once an amount of logs stored (e.g., on the side chain 123) exceeds a threshold value.

Based on the indicated compression type, the compressor 116 may generate and append a label to a respective log. The label may have any suitable content and may be generated in any suitable format for indicating a value of the log based on the indicated compression type. The log may be in any suitable format (e.g., *.log, etc.). For example, if the indicated compression type is redundancy, the generated label may be indicative of a characteristic of the respective log that may be shared with other logs (e.g., time, user associated with the log, event associated with the log, content of the change associated with the log, etc.) In another example, if the indicated compression type is relevancy, the generated label may be indicative of a determined relevancy (e.g., importance, necessity, relatedness to task, etc.) of the respective log, or of a characteristic of the respective log that may be associated with a relevancy value (e.g., a log reflecting an addition to a document associated with a log may include a label indicative of the addition, which may carry a default level of relevancy).

Relevancy may be based on a usage rate of a log, of a format of the log, or of a document associated with the log. For example, if the respective log is associated with a shared code draft that is accessed by multiple users on a daily basis, a high usage rate may indicate a high relevancy. Usage rate may be translated to (e.g., used to determine) relevancy by applying a threshold value, with those logs (or documents) having a usage rate above the threshold value labelled as relevant. Similarly, in those embodiments in which relevancy is based on an amount or quantity of the content associated with the log, the relevancy determination may be based on a comparison of the amount to a threshold value. The amount or quantity of content may be based on a magnitude or delta of the change event (e.g., edit, alteration, addition, etc.) associated with the log, with more drastic changes (e.g., addition of hundreds of lines of code) being more relevant than relatively minor changes (e.g., correction of typos in a list of names).

In some embodiments, fuzzy logic may be utilized by the compressor 116 to determine relevancy. In particular, as each individual component of the log is broken down to determine relevance, the compressor 116 may employ fuzzy logic to generate different versions of a compressed log based on differing weights for individual components' contributions to relevancy. From there, the compressor 116 may evaluate the efficiency (e.g., amount of compression) of each of the generated versions, and may utilize the weighting configuration of a particularly efficient version for ongoing compression. The compressor 116 may sample or select the various versions using high-traffic (e.g., more commonly-accessed) data in order to use fewer resources.

In some embodiments, the compressor 116 may compress the logs based on the generated labels. This compression may include the removal of certain logs, the merging of content of two or more logs, the editing (changing, altering, etc.) of logs, and/or any suitable action that manages the logs and/or their respective content. For example, if the labels are generated based on a redundancy type of compression, the compressor 116 may identify two or more logs that have substantially similar labels (e.g., labels with the same content, labels identifying the same characteristic, etc.) and may delete all but one of the logs with similar labels. These labels are described in greater depth below with regard to FIG. 3. In another example with redundancy compression, the compressor 116 may identify two or more logs that have substantially similar labels, may determine an amount of content shared by the two or more logs, may generate a single log that includes the shared content, and may delete the original two or more logs.

In an example in which the labels are generated based on a relevancy type of compression, the compressor 116 may identify log(s) that have a label indicating a relative importance of the respective log. In those embodiments in which the generated labels are binary or Boolean (e.g., relevant or trivial, important or unimportant, etc.), the compressor 116 may identify all logs with the non-desired label (e.g., all logs with a 'trivial' label if the desired outcome is identifying all trivial logs), and may subsequently delete (e.g., erase from memory, move to recycle bin, archive, etc.) all identified logs. In those embodiments in which the generated labels indicate a relative importance on an analog, continuous, or other multi-value scale (e.g., 0 to 1, 1 to 10, etc.), the compressor 116 may identify all logs that have a label value below a threshold importance value, and may delete all identified logs. This threshold importance value may be pre-determined, may be received from the user device 160, and/or may be based on a time-frame of the indicated compression. For example, if the compression is automatically indicated based on a once-per-month compression for relevancy, the compressor 116 may set a relatively higher threshold importance value based on the longer time-frame and the routine nature of a scheduled clean-up. The compressor 116 may determine relative importance of data based on, for example, a frequency with which the data (or data type) were used or accessed (e.g., more frequently accessed data may be more important), a presence of keywords in the data (e.g., data with more keywords may be more important), uniqueness (e.g., lack of similarity to other log data) of the data (e.g., data that are unique may be more important), and a anomalousness of data (e.g., indication of fraud, abuse, or attack).

In some embodiments, the compressor 116 may provide an estimate regarding a time, a quantity, a savings in space, or any other characteristic associated with the indicated type of compression. The compressor 116 may provide the estimate during or after the compression, as a summary or update on the compression process that is occurring/did occur. The compressor 116 may also provide the estimate prior to the compression operation, such that the estimate may serve as a decision-making datapoint for a user. The compressor 116 may provide a graphical element (e.g., on a graphical user interface (GUI) of the user device 160) in tandem with the estimate. The graphical element may be an option to proceed with, postpone, and/or cancel the compression, which would allow a user to decide on the compression based on an estimate of said compression. The graphical element may be an option to alter one or more characteristics of the compression, and the estimate that accompanies the graphical element may update in real-time based on the altered characteristics. For example, if the indicated type of compression is redundancy, the graphical element may be a list of various accounts associated with one or more logs, such that a user can select to compress logs associated with particular accounts. In another example, if the indicated type of compression is relevancy, the graphical element may be a sliding scale for a relative importance threshold value, or may be a list of various file types associated with one more logs.

As described above, the main chain 121 may serve as a central repository for document data, while the side chain 123 may serve as a workplace of sorts for performing operations on document data and/or logs associated with document data. As such, the compressor 116 may work entirely within the side chain 123, with the various labelling and compressing operations performed on data stored on the side chain 123 rather than on the main chain 121. Once the data stored on the side chain 123 meet a pre-determined criteria (e.g., length of time stored on side chain 123, amount of data stored on side chain 123, etc.), the side chain 123 may merge with the main chain 121, such that all data stored on the side chain 123 is stored on the main chain 121.

The functional modules 114, 116, and 118 of the event system 110 may include a lineage manager 118 configured to receive a request that identifies a document or log, to retrieve one or more logs in response to the request, and to present the one or more logs to the requesting party. The request may be received by the lineage manager 118 from the user device 160 and, particularly, from the application 166. For example, the application 166 may provide a graphical element on the GUI of the user device 160 that enables a user of the user device 160 to generate a request with one or more request parameters. These request parameters may include, for example, an identity of a document, a nature of requested logs associated with the document (e.g., all logs indicating edits or changes to the respective document), a time-frame of logs associated with the document, and any other characteristic of the document that could narrow the search for the lineage manager 118. The request parameters may be in any suitable format, such as *.json, *.xml, or *.string. An example request in JSON may be as shown below:

```
{
  "id":"doc123",
  "name":"", //optional
  "log_mode": "INCREMENTAL", // could be
  INCREMENTAL, ABSOLUTE, RECENT
  "start_time": "ISO Date format",
  "end_time": "ISO Date format",
  "search_pattern" "*noveldata*", // searches all
    entries with noveldata pattern in it. Can use
  regex here
  "filters" : [ ] //list of filter keywords that
    can be used to search
}
```

The lineage manager 118 may retrieve one or more logs by generating a query for the main chain 121 based on the request parameters. As described above, the main chain 121 may serve as a central repository for document data, which would include logs associated with a particular document. In those embodiments in which the compressor 116 operates on the side chain 123 before the data are moved to the main chain 121, the lineage manager 118 may retrieve compressed or otherwise altered document data. The generated query may identify a location or name of a particular document in the main chain 121, as well as a characteristic of logs associated with the particular document. For example, the generated query may identify a particular presentation file, and all logs from the last three months that are associated with the presentation file.

The lineage manager 118 may present the retrieved logs to the requesting party (e.g., a user of the user device 160) by displaying the logs, or a summary of the logs, on a display (e.g., the GUI of the user device 160). The lineage manager 118 may generate a summary of the logs by parsing the content of the retrieved logs into a visual format (e.g., a list of file types, a list of accounts that edited the respective document, etc.). In some embodiments, the particular content parsed may be based on the original request, with the summarized content corresponding to the type of logs initially requested. The original request may also provide an explicit type or format for the summary (e.g., "provide a list of all accounts who have made changes to the presentation in the last three months"). For example, the request may contain an identifier for a document or resource (e.g., "presentation"), and may specify one or more filters or criteria (e.g., "all changes," "last three months"). The request may be a string on a JSON object that contains the request data (e.g., identifier, filters, criteria) as attributes, such as the example shown below:

```
{
"document_id": "ID23405abc"
}
```

The response to the request may be a JSON object or concatenated string with a defined delimiter, and may contain the lineage data (e.g., retrieved logs) and other metadata based on the request filter(s) and criteria, such as the example shown below:

```
{
"document_id" : "ID23405abc",
"document_name" : "image filtering by me.docx",
"document_format" : "docx",
"related_documents" : [ ],
"last_modified": 2019-09-07T-15:50+00,
"modified_by": "user123"
"change_log": [ ]
}
```

In some embodiments, the lineage manager 118 may communicate with the compressor 116 and/or side chain 123 to determine if there are any logs associated with the requested document that remain in-progress (e.g., have not yet been analyzed by the compressor 116). In response to determining that there are in-progress logs, the lineage manager 118 may retrieve those in-progress logs from the side chain 123 for including in the response to the request, without compressing or otherwise altering the logs. This may functionally remove the logs from a queue for the compressor 116, or may leave the logs on the side chain 123 for eventual compression and inclusion on the main chain 121. Alternatively, in response to determining that there are in-progress logs, the lineage manager 118 may request the compressor 116 to immediately perform a compression, even if such a compression would be outside of routine and scheduled compression. As such, the lineage manager 118 may automatically indicate a particular type of compression as part of the request process.

Figure 2:
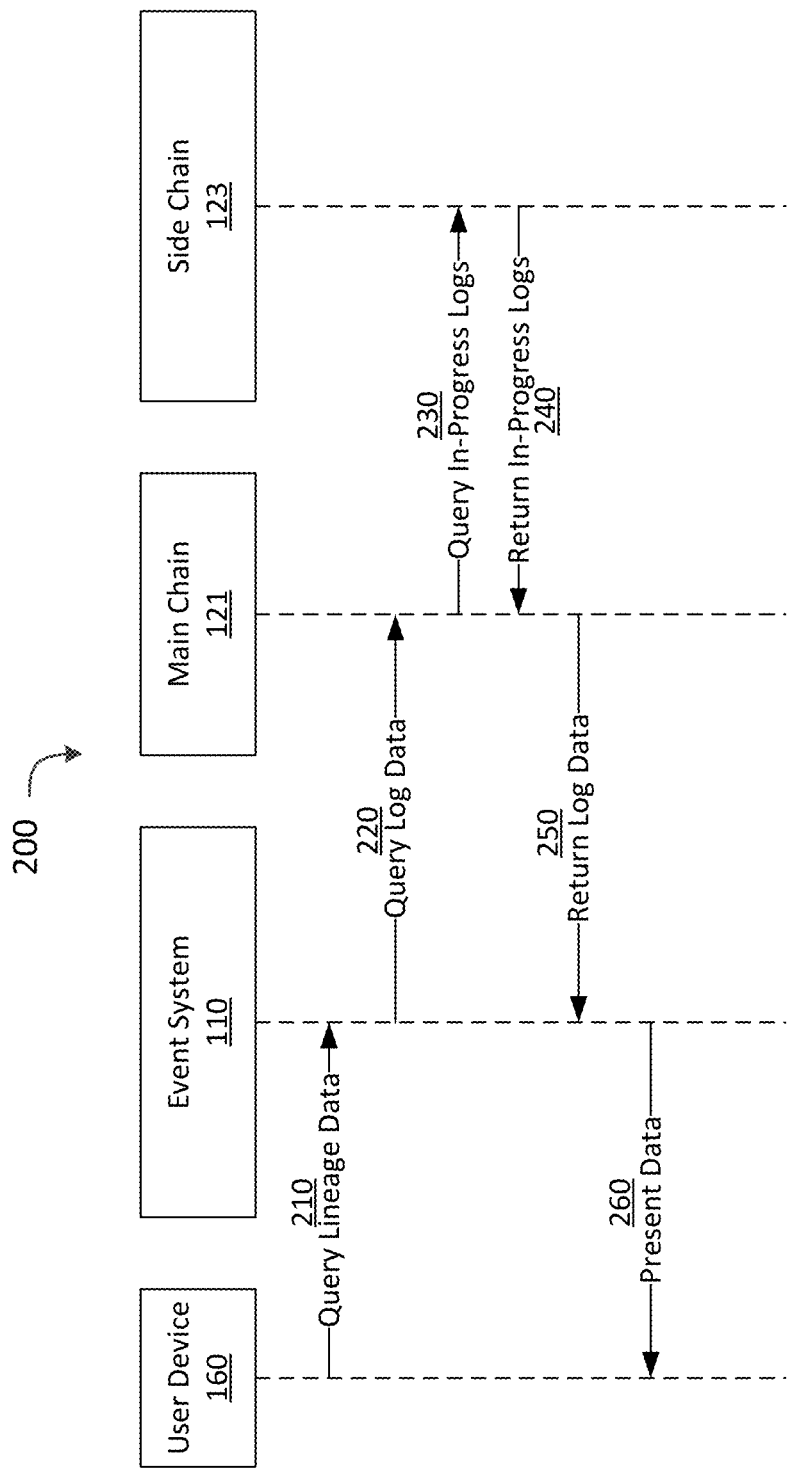
FIG. 2 is a sequence diagram illustrating an example data retrieval process involving the system of FIG. 1.

FIG. 2 is a sequence diagram illustrating an example data retrieval process 200 involving the system 100 (as shown in FIG. 1). In particular, the process 200 may involve the user device 160, the event system 110, the main chain 121, and the side chain 123. The end-result of the process 200 may be an itemized or summarized list of lineage data (e.g., events, logs, etc.) associated with a particular document.

As shown in FIG. 2, the process 200 may include, at operation 210, the user device 160 querying lineage data from the event system 110. The query may be generated by the user device 160 in response to input from a user (e.g., via the GUI of the user device 160), and may specify a particular document(s) for the retrieval of lineage data. For example, the user may be attempting to provide a list of all authors who worked on a document for compliance purposes. In addition to a particular document, the query may also specify an amount, type, and/or characteristic of lineage data (e.g., logs associated with the query) to retrieve. For example, the query may specify all edits made to "Presentation A" in the last three months. In another example, the query may specify all authors of a portion of code logic within a shared draft code.

The process 200 may also include, at operation 220, the event system 110 querying log data from the main chain 121 based on the query from the user device 160 at operation 210. As described above with reference to the lineage manager 118, the event system 110 may generate its own query for the main chain 121 that specifies the data contained in the initial request.

The process 200 may also include, at operation 230, the main chain 121 (e.g., a computing system storing as a storage node for the main chain 121) querying the side chain 123 for any in-progress logs (e.g., logs that have not yet been processed for compression). In some embodiments, the event system 110 may transmit this query directly to the side chain 123. The query may specify the document(s) that is the target of the initial query from the user device 110 in order to determine if there are any logs stored on the side chain 123 and associated with the specific document, which would indicate that those logs have not yet been compressed. The main chain 121 may also query the side chain 123 for missing data on the main chain 121 (e.g., a gap in storage, a pointer that points to a missing file, etc.), or may query the side chain 123 in response to a specific indication that the requested data are stored on the side chain 123.

The process 200 may also include, at operation 240, the side chain 123 returning any in-progress logs to the main chain 121. In response to determining that there are in-progress logs on the side chain 123, the main chain 121 may receive the in-progress logs immediately, or may request that the compressor 116 compress the in-progress logs before receiving the no-longer-in-progress logs. In those examples in which the compressor 116 compresses the in-progress logs before they are received by the main chain 121, the type of compression may be automatically indicated by the compressor 116 as redundancy or relevancy based on an operating characteristic (e.g., timing) of the event system 110.

The process 200 may also include, at operation 250, the main chain 121 returning log data to the event system 110. This log data may include log data that were already stored on the main chain 121, as well as any in-progress logs—compressed or not—from the side chain 123.

The process 200 may also include, at operation 260, the event system 110 summarizing and presenting the retrieved log data to the user device 160. As described above, the event system 110 (e.g., the lineage manager 118) may summarize the retrieved log data based on the initial query, such that the event system 110 provides a visual marker (e.g., itemized list) that corresponds to the type of requested data. The itemized list may be in a downloadable and exportable format (e.g., *.csv, *.xls, etc.).

FIG. 3 illustrates an example set of uncompressed logs 300 and an example set of compressed logs 350. The uncompressed set 300 may include a first uncompressed log 301, a second uncompressed log 302, a third uncompressed log 303, a fourth uncompressed log 304, and a fifth uncompressed log 305. The compressed set 350 may include a first compressed log 351 and a second compressed log 352. In this example, the indicated type of compression may be redundancy. As shown, each log may correspond to an event for a document, and may include data regarding a time of the event, a user associated with the event, an action associated with the event, and a change to the document associated with the event. For example, the first uncompressed log 301 may indicate that at time '1661062512,' user 'reed' took the action 'Insert new email address,' which resulted in change 'Email:reed@example.com' in the respective document. The time may be in unix/epoch format. Each log may be generated by the generator 114 in response to an event taking place, such that the event system 110 may monitor document(s) stored on the main chain 121 and may generate log(s) based on the monitoring.

In order to compress uncompressed set 300 into compressed set 350, the compressor 116 (shown in FIG. 1) may receive an indication of a type of compression. In this example, the indicated type of compression is redundancy based on the action associated with each event. Accordingly, the compressor 116 may label each uncompressed log 301-305 based on the action associated with each log. In some embodiments, these labels may be the content shown for each log in uncompressed set 300 (e.g., "Insert new email address," "Update credit card," etc.). In some embodiments, these labels may be bits included in the metadata of each log, and may be indicative of at least a part of the content in each log. Because the labels in the example shown in FIG. 3 are based on the action associated with each log, the labels for uncompressed logs 301, 304, and 305 may be indicative of an email address-related action, and the labels for uncompressed logs 302 and 303 may be indicative of a credit card-related action.

As shown, the compressed set 350 includes the first compressed log 351 that includes content from uncompressed logs 301, 304, and 305, and the second compressed log 352 that includes content from uncompressed logs 302 and 303. Put differently, each of the first uncompressed log 301, the fourth uncompressed log 304, and the fifth uncompressed log 305 may be compressed into first compressed log 351, and each of the second uncompressed log 302 and the third uncompressed log 303 may be compressed into second compressed log 352. Those uncompressed logs with email-related actions may be compressed into a single log, and those uncompressed logs with credit card-related actions may be compressed into a single log.

Figure 4:
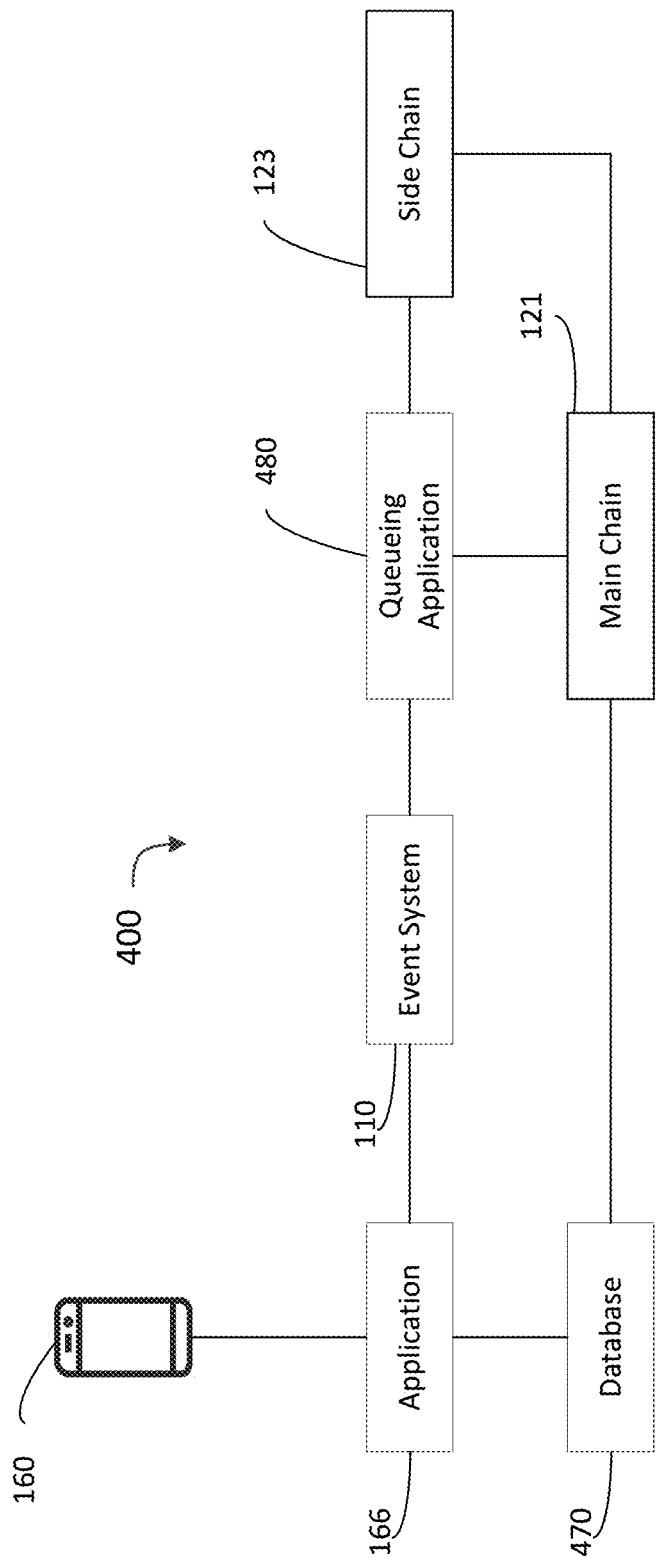
FIG. 4 is a block diagram of an example system for managing and maintaining data lineage.

FIG. 4 is a block diagram for an example system 400 for managing and maintaining data lineage. As shown in FIG. 4, the system 400 may include the user device 160, the application 166, a database 470, a queueing application 480, the event system 110, the side chain 123, and the main chain 121. The database 470 may be implemented in connection with a local server and may provide a local repository for data, separate from but connected to the main chain 121 (e.g., an instance of the main chain 121). For example, the database 470 may be local storage for the user device 160, and may be in communication with the main chain 121 via a standard file transfer protocol system. The queueing application 480 may be in communication with the side chain 123 and the main chain 121, and may facilitate the process of merging data from the side chain 123 to the main chain 121. For example, the queueing application 480 may determine which logs generated by the event system 110 are stored on the side chain 123, as well as when to store blocks of data on the side chain 123 or on the main chain 121. In particular, when the application 166 receives a request to update or modify data (e.g., from the user device 160), the application 166 may identify the user responsible for the update/modification and may transmit this information to the queueing application 480 via the event system 110. In some embodiments, the queueing application 480 may be included within the event system 110.

Figure 5:
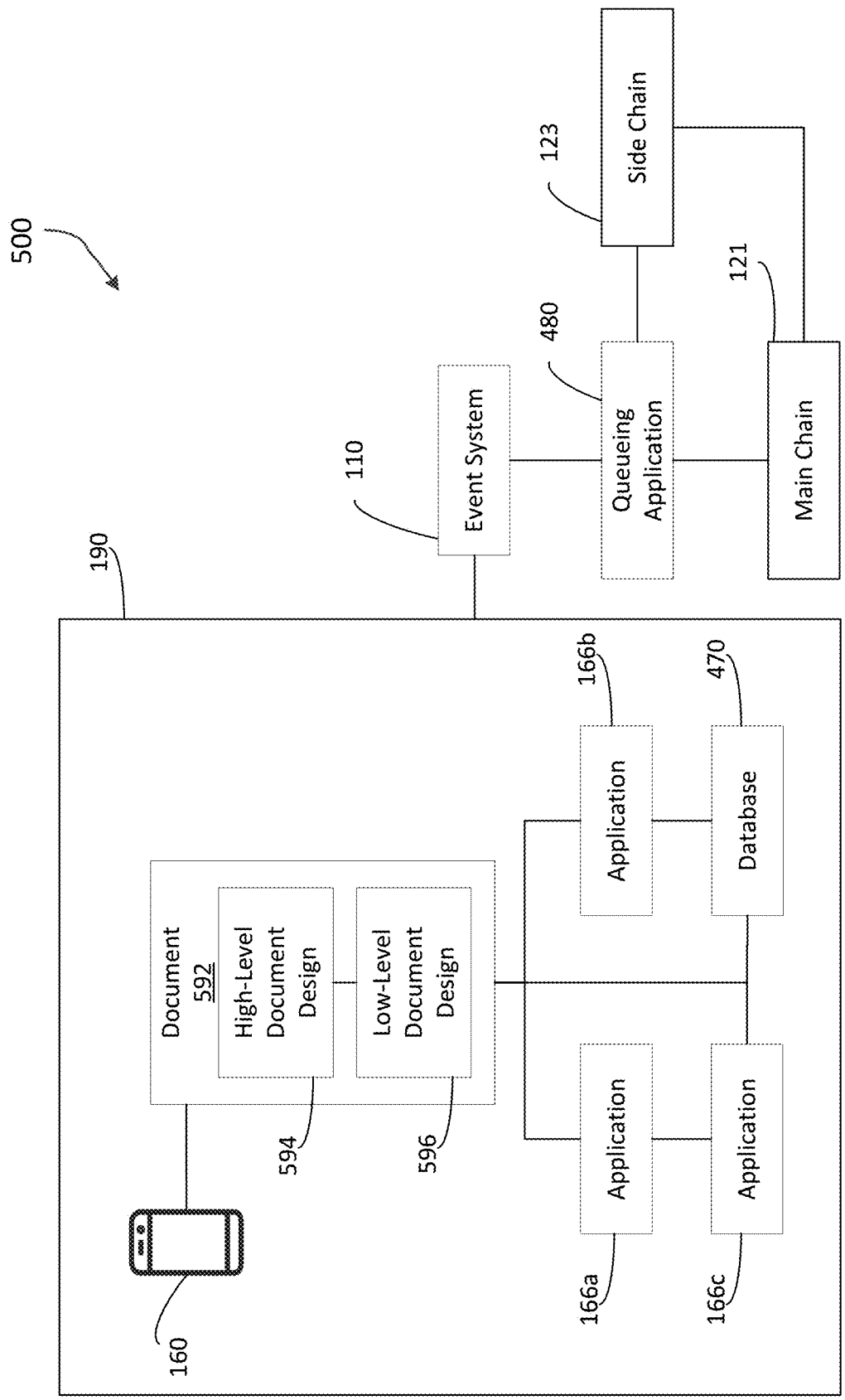
FIG. 5 is a block diagram of an example system for managing and maintaining data lineage with a standardized document system.

FIG. 5 is a block diagram for an example system 500 for managing and maintaining data lineage with a standardized document system. As shown in FIG. 5, the system 500 may include sub-system 190 in communication with the event system 110, which may in turn be in communication with the queueing application 480 of FIG. 4. The sub-system 190 may include the user device 160 in communication with a document 592 (e.g., accessing the document 592). The document 592 may be a standardized document (e.g., boilerplate contract, template for presentation, etc.) and may include aspects of high-level document design 594 and aspects of low-level document design 596. The high-level document design 594 may include default settings for the document 592 based on an intended use or requirement for the document 592 (e.g., a presentation file must include a disclaimer slide, any formal letter uses a particular theme, etc.), and the low-level document design 596 may determine code or other backend data associated with the high-level document design 594. The document 592 may be provided to or accessed by first application 166a, second application 166b, third application 166c (collectively "the applications 166") and the database 470. Each of the applications 166 may be programs coded into and stored on the memory 164 of the user device 160 and executed by the processor 162 to edit, affect, or otherwise work with the document 592. Similarly the database 470, as a local repository (e.g., on the memory 164), may interact with and/or store document 592.

Figure 6:
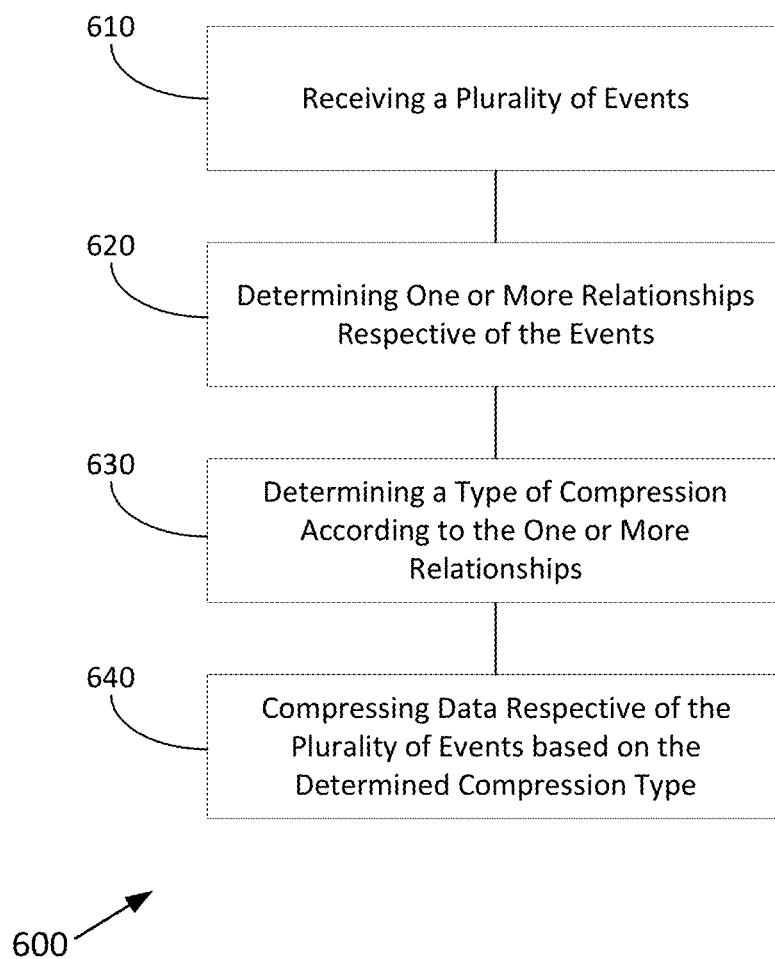
FIG. 6 is a flow chart illustrating an example method of managing data lineage.

FIG. 6 is a flow chart illustrating an example method 600 of managing data lineage. The method 600, or one or more portions of the method 500, may be performed by the event system 110 (shown in FIG. 1), in some embodiments.

The method 600 may include, at block 610, receiving a plurality of events. The plurality of events may be logs indicative of one or more changes made to one or more documents. The documents may be stored on the main chain 121 and/or the database 470, and the plurality of events may be stored in the same location as their corresponding documents, or may be stored on the side chain 123.

The method 600 may include, at block 620, determining one or more relationships respective of the events. The relationships may include content stored on or associated with each of the plurality of logs, or may be based on the content stored on or associated with each of the plurality of logs. For example and with reference to FIG. 3, a relationship may be that a particular event (e.g., log 301) is associated with the addition of an email address to a respective document, and another relationship may be that two events (e.g., logs 301 and 305) are both associated with the same user (e.g., "reed").

The method 600 may include, at block 630, determining a type of compression (e.g., relevancy, redundancy, etc.) according to the one or more relationships. As described above with reference to the compressor 116, the indication of a type of compression may be automatically determined based on the content of the events to be compressed. For example, if the one or more determined relationships indicate that there are several (e.g., a threshold amount) of events regarding additions to the same document, the indicated type of compression may be redundancy. In another example and with reference to FIG. 3, if the one or more determined relationships indicate that the same action (e.g., "update credit card") is associated with two or more events (e.g., logs 302 and 303), the indicated type of compression may be redundancy.

The method 600 may include, at block 640, compressing data respective of the plurality of events based on the determined compression type. As described above with reference to uncompressed set 300 and compressed set 350, compressing data may include the identification of non-shared content (e.g., what content is included in one event but not another) and generating a single event that includes all (or substantially all) non-shared content, as well as the shared content that initially led to the events being determined as related. As a continuation of the example from block 630, the compression of logs 302 and 303 may result in log 352.

Figure 7:
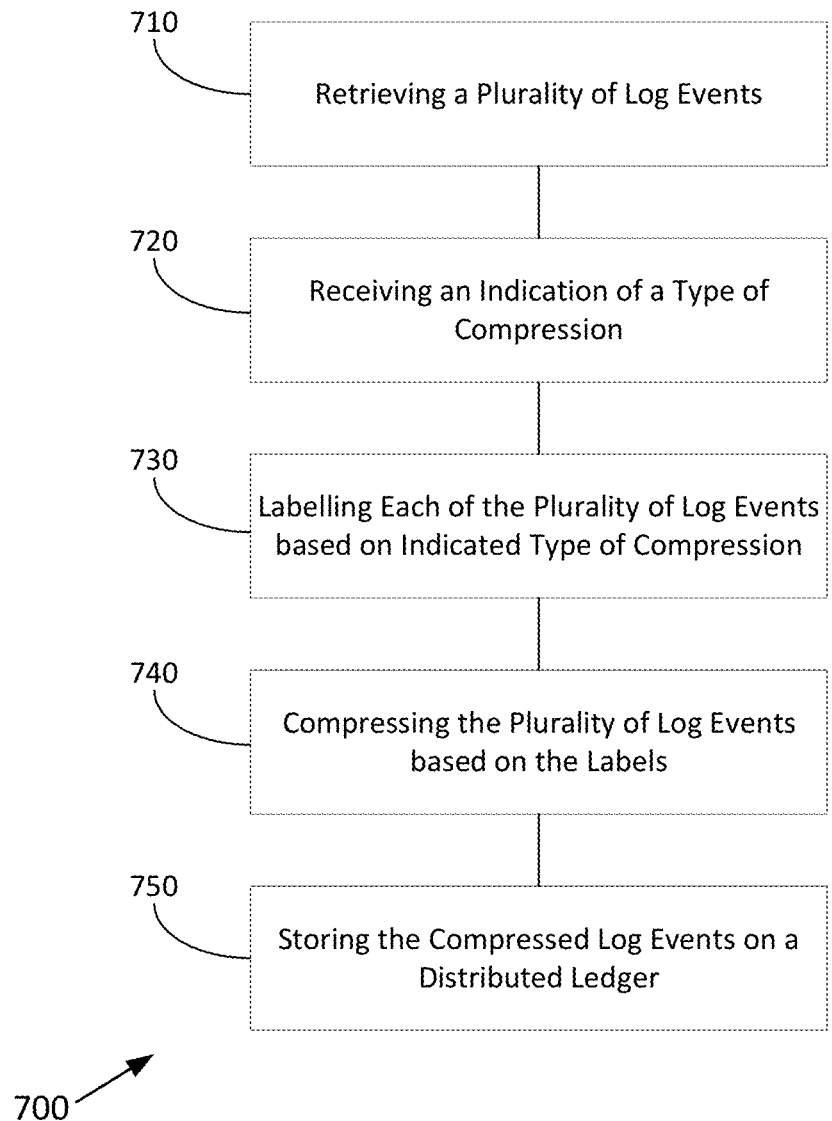
FIG. 7 is a flow chart illustrating an example method of managing data lineage.

FIG. 7 illustrates a flow chart for an example method 700 of managing data lineage. The method 700 includes partial overlap with the method 600 of FIG. 6. For example, while the method 600 of FIG. 6 addresses determination of relationships among data and subsequent determination of a type of compression based on the determined relationships, the method 700 of FIG. 7 recharacterizes these concepts by instead describing receiving an indication of a type of compression. Both methods 600, 700 may find use with any type of event-related data. The method 700, or one or more portions of the method 500, may be performed by the event system 110, in some embodiments.

The method 700 may include, at block 710, receiving a plurality of log events. As described above with reference to block 610, the plurality of log events may be logs indicative of one or more changes made to one or more documents. The documents may be stored on the main chain 121 and/or the database 470, and the plurality of log events may be stored in the same location as their corresponding documents, or may be stored on the side chain 123.

The method 700 may include, at block 720, receiving an indication of a type of compression. As described above with reference to the compressor 116, the indication may be received from user device 160, or may be automatically determined based on the log events, content of the log events, time, etc. The indicated type of compression may be 'redundancy' to remove duplicative log events or 'relevancy' to remove trivial log events.

The method 700 may include, at block 730, labelling each of the plurality of log events based on the indicated type of compression. As described above with reference to the compressor 116, the labelling for redundancy may be based on identifying at least a portion of content for a log event that is shared by at least one other log event, and then labelling each to indicate the shared content. The labelling for relevancy may be based on a particular type associated with the respective log event (e.g., "update credit card" of uncompressed log 302), on the document associated with the respective log event, or on particular content of the respective log event (e.g., "Email: reed@example com" of uncompressed log 301).

The method 700 may include, at block 740, compressing the plurality of log events based on the labels. As described above with reference to uncompressed set 300 and compressed set 350, the compressing may include generating a single log event to replace the redundant log events, or may include deleting all trivial log events.

The method 700 may include, at block 750, storing the compressed log events on a distributed ledger. This distributed ledger may be main chain 121, or may be side chain 123 for temporary storage (e.g., based on the queueing application).

Figure 8:
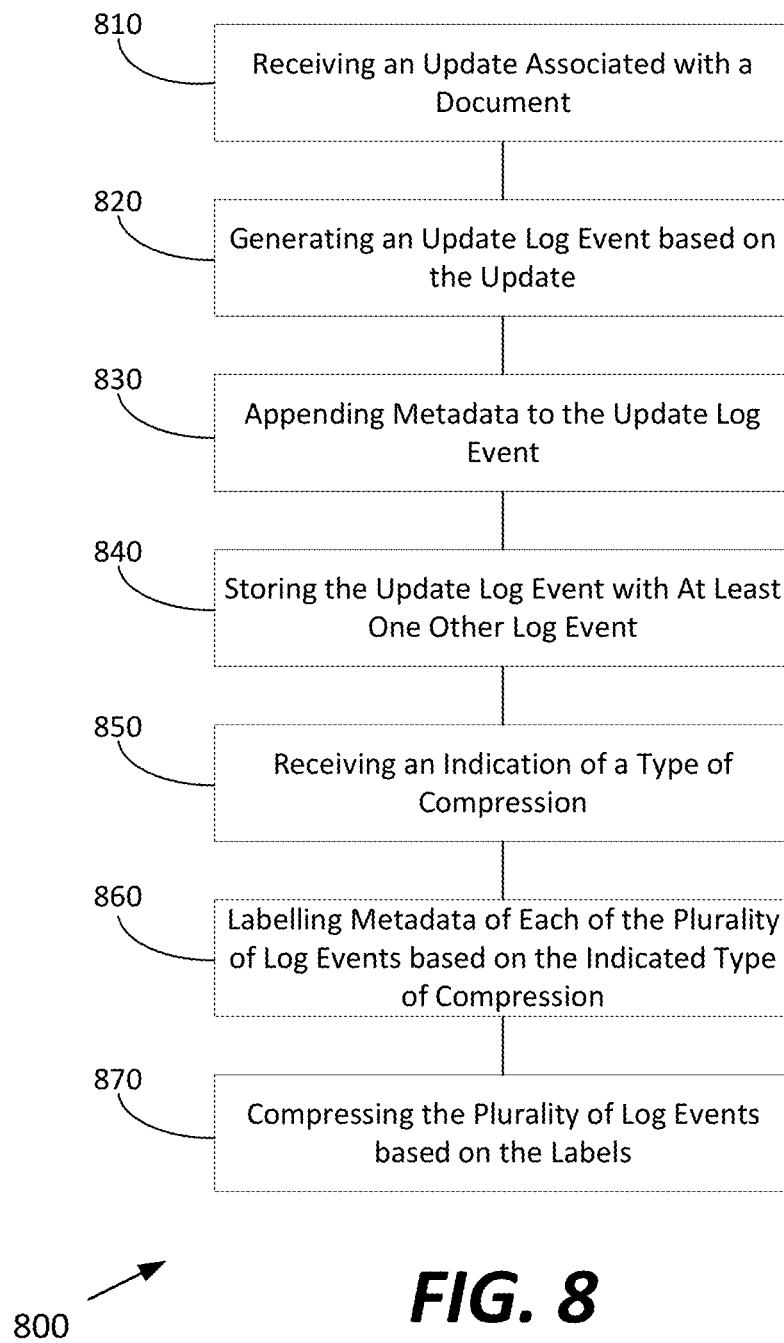
FIG. 8 is a flow chart illustrating an example method of managing data lineage.

FIG. 8 illustrates a flow chart for an example method 800 of managing data lineage. The method 800 may find particular use with document updates. Accordingly, the method 800 includes partial overlap with methods 600, 700, for embodiments in which the events are or are related to document updates. The method 800, or one or more portions of the method 500, may be performed by the event system 110, in some embodiments.

The method 800 may include, at block 810, receiving an update associated with a document. The document may be document 592, and the update may be generated by the user device 160 using one of the applications 166. The event system 110 may receive the update automatically as it is made, in a batch after a certain number of updates have been made, or may be pushed to update by the application 166.

The method 800 may include, at block 820, generating an update log event based on the update, and, at block 830, appending metadata to the update log event. The generated update log event may include data indicative of the update, such as a user who made the update, the document associated with the update, a time of the update, etc. The metadata for the update log event may also include such indicators, as well as tags or other indicators of data associated with the update. For example, the generated update log event may include the identity of the user, and the metadata for the log event may include a rank of the user, access permissions, or other datapoints that may be used to determine relevance or relatedness of the log event to other log events.

The method 800 may include, at block 840, storing the update log event with at least one other log event. These log events may be stored in local storage (e.g., the database 470), or on a distributed ledger (e.g., the side chain 123, the main chain 121, etc.). For example, the update log events may be stored on the side chain 123 until the compressor 116 process the log events.

The method 800 may include, at block 850, receiving an indication of a type of compression. As described above with reference to block 720, the indication may be received from user device 160, or may be automatically determined based on the log events, content of the log events, time, etc. The indicated type of compression may be 'redundancy' to remove duplicative log events or 'relevancy' to remove trivial log events.

The method 800 may include, at block 860, labelling metadata of each of the plurality of log events based on the indicated type of compression. As described above with reference to block 730, the labelling for redundancy may be based on identifying at least a portion of content for a log event that is shared by at least one other log event, and then labelling each to indicate the shared content. The labelling for relevancy may be based on a particular type associated with the respective log event, on the document associated with the respective log event, or on particular content of the respective log event.

The method 800 may include, at block 870, compressing the plurality of log events based on the labels. As described above with reference to block 740, the compressing may include generating a single log event to replace the redundant log events, or may include deleting all trivial log events.

Figure 9:
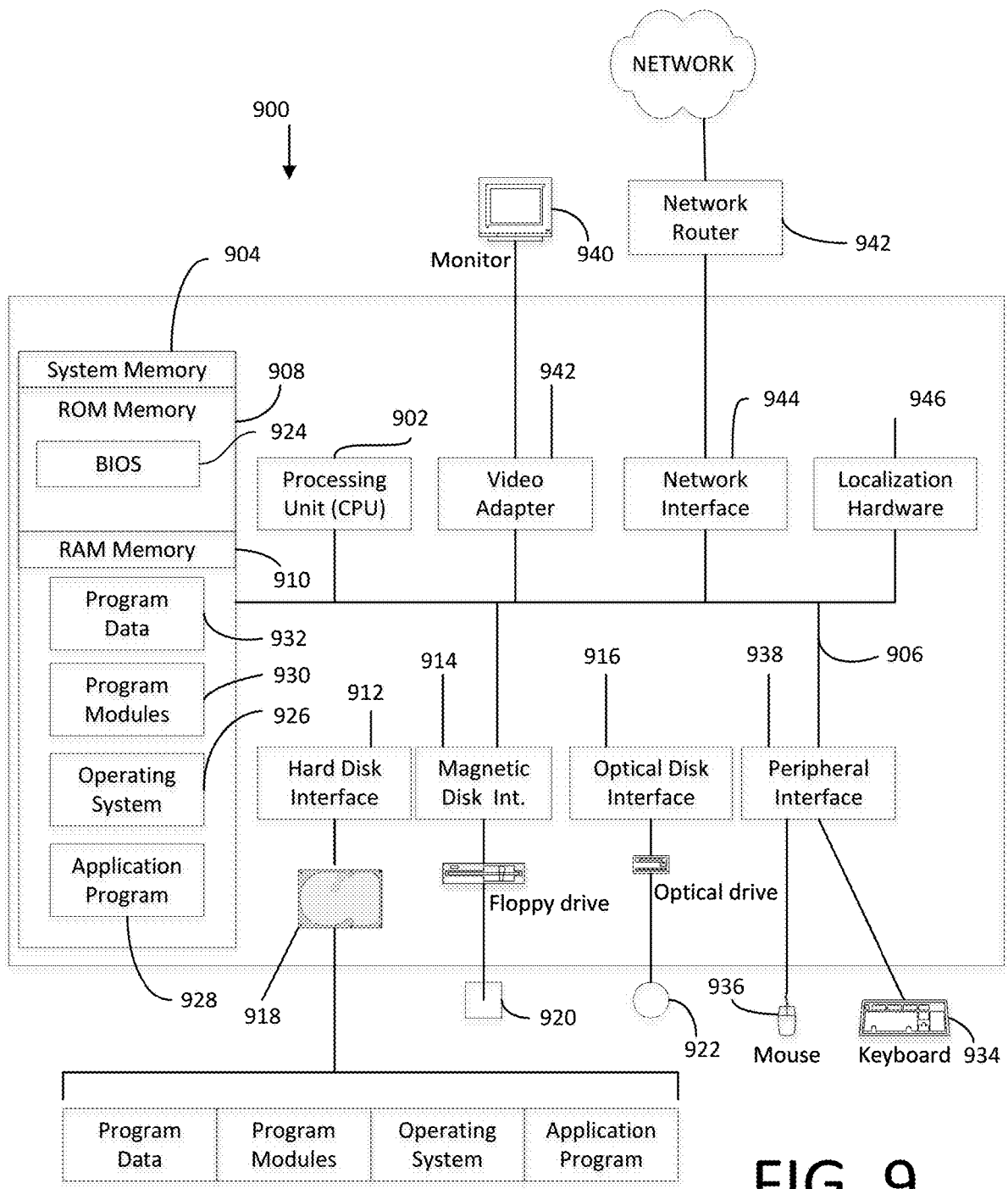
FIG. 9 is a diagrammatic view of an example embodiment of a user computing environment.

FIG. 9 is a diagrammatic view of an example embodiment of a user computing environment that includes a computing system environment 900, such as a desktop computer, laptop, smartphone, tablet, or any other such device having the ability to execute instructions, such as those stored within a non-transient, computer-readable medium. For example, the computing system environment 900 may be the user device 160 or a node 122, 124 of the blockchain system 120. In another example, one or more components of the computing system environment 900, such as one or more CPUs 902, RAM memory 910, network interface 944, and one or more hard disks 918 or other storage devices, such as SSD or other FLASH storage, may be included in the event system 110. Furthermore, while described and illustrated in the context of a single computing system, those skilled in the art will also appreciate that the various tasks described hereinafter may be practiced in a distributed environment having multiple computing systems linked via a local or wide-area network in which the executable instructions may be associated with and/or executed by one or more of multiple computing systems.

In its most basic configuration, computing system environment 900 typically includes at least one processing unit 902 (e.g., processor 162) and at least one memory 904 (e.g., memory 164), which may be linked via a bus. Depending on the exact configuration and type of computing system environment, memory 904 may be volatile (such as RAM 910), non-volatile (such as ROM 908, flash memory, etc.) or some combination of the two. Computing system environment 900 may have additional features and/or functionality. For example, computing system environment 900 may also include additional storage (removable and/or non-removable) including, but not limited to, magnetic or optical disks, tape drives and/or flash drives. Such additional memory devices may be made accessible to the computing system environment 900 by means of, for example, a hard disk drive interface 912, a magnetic disk drive interface 914, and/or an optical disk drive interface 916. As will be understood, these devices, which would be linked to the system bus, respectively, allow for reading from and writing to a hard disk 918, reading from or writing to a removable magnetic disk 920, and/or for reading from or writing to a removable optical disk 922, such as a CD/DVD ROM or other optical media. The drive interfaces and their associated computer-readable media allow for the nonvolatile storage of computer readable instructions, data structures, program modules and other data for the computing system environment 900. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nano-drives, memory sticks, other read/write and/or read-only memories and/or any other method or technology for storage of information such as computer readable instructions, data structures, program modules or other data. Any such computer storage media may be part of computing system environment 900.

A number of program modules may be stored in one or more of the memory/media devices. For example, a basic input/output system (BIOS) 924, containing the basic routines that help to transfer information between elements within the computing system environment 900, such as during start-up, may be stored in ROM 908. Similarly, RAM 910, hard disk 918, and/or peripheral memory devices may be used to store computer executable instructions comprising an operating system 926, one or more applications programs 928 (which may include the functionality of the event system 110 of FIG. 1 or one or more of its functional modules 114, 116, and 118, for example), other program modules 930, and/or program data 932. Still further, computer-executable instructions may be downloaded to the computing environment 900 as needed, for example, via a network connection.

An end-user may enter commands and information into the computing system environment 900 through input devices such as a keyboard 934 and/or a pointing device 936. While not illustrated, other input devices may include a microphone, a joystick, a game pad, a scanner, etc. These and other input devices would typically be connected to the processing unit 902 by means of a peripheral interface 938 which, in turn, would be coupled to bus. Input devices may be directly or indirectly connected to processor 902 via interfaces such as, for example, a parallel port, game port, firewire, or a universal serial bus (USB). To view information from the computing system environment 900, a monitor 940 or other type of display device may also be connected to bus via an interface, such as via video adapter 942. In addition to the monitor 940, the computing system environment 900 may also include other peripheral output devices, not shown, such as speakers and printers.

The computing system environment 900 may also utilize logical connections to one or more computing system environments. Communications between the computing system environment 900 and the remote computing system environment may be exchanged via a further processing device, such a network router 942, that is responsible for network routing. Communications with the network router 942 may be performed via a network interface component 944. Thus, within such a networked environment, e.g., the Internet, World Wide Web, LAN, or other like type of wired or wireless network, it will be appreciated that program modules depicted relative to the computing system environment 900, or portions thereof, may be stored in the memory storage device(s) of the computing system environment 900.

The computing system environment 900 may also include localization hardware 956 for determining a location of the computing system environment 900. In embodiments, the localization hardware 956 may include, for example only, a GPS antenna, an RFID chip or reader, a WiFi antenna, or other computing hardware that may be used to capture or transmit signals that may be used to determine the location of the computing system environment 900.

In some embodiments, a computer-implemented method may include receiving, from a data application by a computing system, a plurality of events, each event representative of a computing transaction, determining, by the computing system, whether each of the plurality of events includes a trivial event based on respective metadata of each of the plurality of events, determining, by the computing system, a type of compression as relevancy according to the one or more relationships, and compressing, by the computing system, data respective of the plurality of events based on relevancy.

In some of these embodiments, the compressing includes deleting each trivial event from storage.

In some of these embodiments, the determination of whether each of the plurality of events includes a trivial event may includes determining, from a plurality of categories, a category of data associated with a respective event, retrieving respective usage rates for the plurality of categories, associating the determined category with a respective usage rate, and determining that the respective usage rate may be below a threshold value.

In some of these embodiments, the determination of whether each of the plurality of log events includes a trivial event may include determining an amount of data change associated with a respective computing transaction, and determining that the amount of data change may be below a threshold value.

In some of these embodiments, the determination of whether each of the plurality of log events includes a trivial event further may include determining, from a plurality of categories, a category of data associated with the respective event, and retrieving change values for the plurality of categories. The threshold value may be a retrieved change value associated with the determined category.

In some of these embodiments, the determination of whether each of the plurality of events includes the trivial event may include determining, via fuzzy logic, a trivial score for an event of the plurality of events, comparing the determined trivial score to a relevancy threshold, and in response to the determined trivial score being less than the relevancy threshold, determining that the respective event includes the trivial event.

In some of these embodiments, the fuzzy logic determines the trivial score for each event based on at least one of an amount of data change associated with the respective event, or a category of data associated with the respective event.

In some of these embodiments, the method may further include determining, for the plurality of events, a category of data associated with each event, and determining at least one other event that shares the determined category. The compressing may include combining events with the shared category into a data format that may be smaller than the individual events.

In some of these embodiments, one or more of the events may be associated with one or more files, wherein each event associated with a file may be further associated with metadata indicative of a lineage of computing transactions that altered the file.

In some of these embodiments, the method may further include receiving, from a user device, a request identifying a document, retrieving, based on metadata of the document, at least one event associated with the document, and presenting, on a display of the user device, the at least one retrieved event.

In some of these embodiments, the method may further include receiving, from the user device, an update associated with the document, generating an update event based on the update, determining an updated relationship with the plurality of events respective of the updated event, determining an updated type of compression according to the updated relationship, and further compressing data respective of the update event based on the updated compression type.

In some embodiments, a non-transitory computer readable medium may store program instructions that, when executed by a processor, may cause a computer system to perform operations including retrieving a plurality of log events, each log event associated with a respective computing transaction, receiving an indication of a type of compression, labelling each of the plurality of log events based on the indicated type of compression, compressing the plurality of log events based on the labels, and storing the compressed log events on a distributed ledger, wherein the storage includes bibliographic information respective of the computing transactions associated with the events.

In some of these embodiments, the updating of the distributed ledger may include storing the compressed plurality of log events on a side-chain of the distributed ledger, and in response to a threshold value for the storage, appending a subset of the plurality of log events to a main chain of the distributed ledger.

In some of these embodiments, the indicated type of compression includes a redundancy type, and the labelling may include for each log event of the plurality of log events, retrieving a category of data associated with the log event, determining at least one other log event that shares the retrieved category, and appending, to metadata of the log event and of the at least one other log event, an indication of the shared category.

In some of these embodiments, the compressing may include combining log events with the indication of the shared category into a single combined log entry.

In some embodiments, a system may include a processor, and a non-transitory computer readable medium stored thereon instructions that may be executable by the processor to cause the system to perform operations including receiving, from a user device, an update associated with a document, generating an update log event based on the update, appending metadata to the update log event, the metadata indicative of a property of the update, storing the update log event with at least one other log event to generate a plurality of log events, receiving an indication of a type of compression, labelling metadata of each of the plurality of log events based on the indicated type of compression, and compressing the plurality of log events based on the labels.

In some of these embodiments, the computer-readable medium may further store instructions that cause the computer system to perform further operations including receiving, from the user device, a request identifying a requested document, retrieving at least one log event from the plurality of log events associated with the document based on metadata, and presenting, on a display of the user device, the at least one log event.

In some of these embodiments, the presenting the at least one log event may include retrieving, from the at least one log event, a change to the requested document, and displaying, on the display, the change.

In some of these embodiments, the indicated type of compression may include a redundancy type, and the labelling may include for each log event, retrieving a category of data associated with the log event, determining at least one other log event that shares the retrieved category, and further appending, to metadata of the log event and of the at least one other log event, an indication of the shared category the type of compression.

In some of these embodiments, the indicated type of compression includes a relevancy type, and the labelling may include for each log event of the plurality of log events, determining a trivial score based on the appended metadata, comparing the determined trivial score to a relevancy threshold, and in response to the determined trivial score being less than the relevancy threshold, further appending, to metadata of the log event, an indication that the respective log event may be trivial.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various presently disclosed embodiments. It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

What is claimed is:

1. A computer-implemented method for compressing data respective of a file, the method comprising:
   receiving, from a data application by a computing system, a plurality of events, each event representative of a respective revision to the file by a user, wherein each event is associated with metadata indicative of a lineage of computing transactions that altered the file;
   determining, by the computing system, whether each of the plurality of events comprises a trivial event based on respective metadata of each of the plurality of events;
   determining, by the computing system, a type of compression as relevancy according to one or more relationships between the plurality of events; and
   compressing, by the computing system, data respective of the plurality of events based on relevancy;
   wherein the determination of whether each of the plurality of events comprises the trivial event comprises:
      determining, via fuzzy logic, a trivial score for each event of the plurality of events by generating a plurality of versions of a compressed file based on differing weights for individual events and determining an amount of compression for each of the versions;
      comparing the determined trivial score to a relevancy threshold; and
      in response to the determined trivial score being less than the relevancy threshold, determining that the respective event comprises the trivial event.

2. The method of claim 1, wherein the compressing comprises deleting each trivial event from storage.

3. The method of claim 1, wherein the determination of whether each of the plurality of events comprises a trivial event comprises:
   determining, from a plurality of categories, a category of data added to the file in a respective event;
   retrieving respective usage rates for the plurality of categories;
   associating the determined category with a respective usage rate; and
   determining that the respective usage rate is below a threshold value.

4. The method of claim 1, wherein the determination of whether each of the plurality of events comprises a trivial event comprises:
   determining an amount of content change in the file associated with a respective computing transaction; and
   determining that the amount of content change is below a threshold value.

5. The method of claim 4, wherein the determination of whether each of the plurality of events comprises a trivial event further comprises:
   determining, from a plurality of categories, a category of data associated with the respective event; and
   retrieving change values for the plurality of categories, wherein the threshold value is a retrieved change value associated with the determined category.

6. The method of claim 1,
   wherein the fuzzy logic determines the trivial score for each event based on at least one of:
      an amount of data change associated with the respective event; or
      a category of data associated with the respective event.

7. The method of claim 1, further comprising:
   determining, for the plurality of events, a category of data associated with each event; and
   determining at least one other event that shares the determined category,
   wherein the compressing comprises combining events with the shared category into a data format that is smaller than the individual events.

8. The method of claim 1, further comprising:
   receiving, from a user device, a request identifying the file;
   retrieving, based on the metadata of the file, at least one event associated with the file; and
   presenting, on a display of the user device, the at least one retrieved event.

9. The method of claim 8, further comprising:
receiving, from the user device, an update associated with the file;
generating an update event based on the update;
determining an updated relationship with the plurality of events respective of the updated event;
determining an updated type of compression according to the updated relationship; and
further compressing data respective of the update event based on the updated compression type.

10. The computer-implemented method of claim 1, wherein compressing the data respective of the plurality of events comprises compressing a changelog respective of the file.

11. A non-transitory, computer readable medium storing program instructions that, when executed by a processor, cause a computer system to perform operations comprising:
receiving, from a data application, a plurality of revisions to a file;
determining whether each of the plurality of revisions comprises a trivial revision based on respective metadata of each of the plurality of revisions;
determining a type of compression as relevancy according to one or more relationships between the plurality of revisions;
compressing a changelog respective of the file based on a relevancy of each of the revisions;
receiving, from a user device, a request identifying the file;
retrieving, based on metadata of the file, at least one revision associated with the file based on the changelog; and
presenting, on a display of the user device, the at least one retrieved revision;
wherein the determination of whether each of the plurality of revisions comprises the trivial revision comprises:
determining, via fuzzy logic, a trivial score for each revision of the plurality of revisions by generating a plurality of versions of a compressed file based on differing weights for individual revisions and determining an amount of compression for each of the versions;
comparing the determined trivial score to a relevancy threshold; and
in response to the determined trivial score being less than the relevancy threshold, determining that the respective event comprises the trivial event.

12. The non-transitory, computer-readable medium of claim 11, wherein the operations further comprise:
receiving, from the user device, an update revision with the file;
determining an updated relationship with the plurality of revisions respective of the updated revision;
determining an updated type of compression according to the updated relationship; and
further compressing the changelog based on the updated compression type.

13. The non-transitory, computer-readable medium of claim 11, wherein the determination of whether each of the plurality of revisions comprises a trivial revision comprises:
determining, from a plurality of categories, a category of data associated with a respective revision;
retrieving respective usage rates for the plurality of categories;
associating the determined category with a respective usage rate; and
determining that the respective usage rate is below a threshold value.

14. The non-transitory, computer-readable medium of claim 11, wherein the determination of whether each of the plurality of revisions comprises a trivial revision comprises:
determining an amount of data change associated with a respective revision;
determining, from a plurality of categories, a category of data associated with the respective revision;
retrieving change values for the plurality of categories; and
determining that the amount of data change is below a threshold value,
wherein the threshold value is a retrieved change value associated with the determined category.

15. The non-transitory, computer-readable medium of claim 11, wherein the file is a computer code file.

16. A system for compressing data respective of a file, the system comprising:
a processor; and
a non-transitory computer readable medium stored thereon instructions that are executable by the processor to cause the system to perform operations comprising:
receiving, from a data application, a plurality of events, each event representative of a revision to file;
determining, via fuzzy logic, a trivial score for an event of the plurality of events by:
determining a trivial score for each event of the plurality of events by generating a plurality of versions of a compressed file based on differing weights for individual events and determining an amount of compression for each of the versions;
comparing the determined trivial score to a relevancy threshold;
in response to the determined trivial score being less than the relevancy threshold, determining that the respective event comprises the trivial event;
determining a type of compression as relevancy according to one or more relationships between the plurality of events; and
compressing data respective of the plurality of events based on relevancy.

17. The system of claim 16, wherein the fuzzy logic determines the trivial score for each event based on at least one of:
an amount of data change associated with the respective event; or
a category of data associated with the respective event.

18. The system of claim 16, wherein the compressing comprises deleting each trivial event from storage.

19. The system of claim 16, wherein one or more of the events are associated with one or more files, wherein each event associated with a file is further associated with metadata indicative of a lineage of computing transactions that altered the file.

20. The system of claim 16, wherein compressing the data respective of the plurality of events comprises compressing a changelog respective of the file.

* * * * *